United States Patent [19]

Hearn

[11] 3,728,613
[45] Apr. 17, 1973

[54] SYNCHRONIZED PERIOD MEASURING SYSTEM

[75] Inventor: Daniel P. Hearn, Richardson, Tex.

[73] Assignee: Atlantic Richfield Company, New York, N.Y.

[22] Filed: Feb. 2, 1971

[21] Appl. No.: 111,952

[52] U.S. Cl. .................................................324/.5 R
[51] Int. Cl. ............................................G01r 33/08
[58] Field of Search ....................324/.5 E, .5 F, .5 A

[56] References Cited

UNITED STATES PATENTS 3,467,856    9/1969    Hearn..................................324/.5 E Primary Examiner—Michael L. Lynch
Attorney—Blucher S. Tharp and Robert E. Lee, Jr.

[57] ABSTRACT

An improvement in optical magnetometers whereby the accuracy of the output signal is increased. The depumping frequency is determined by measuring the time interval for a predetermined number of cycles to occur. Error due to sweeping the depumping frequency is prevented by making the sweep frequency a submultiple of the depumping frequency.

4 Claims, 4 Drawing Figures

INVENTOR
DANIEL P. HEARN

Robert Ellsworth Lee
ATTORNEY

SYNCHRONIZED PERIOD MEASURING SYSTEM

BACKGROUND OF THE INVENTION

This invention relates to an improvement in optical magnetometers and, more particularly, to a helium magnetometer wherein a period measuring system is used to determine the depumping frequency.

The advent of high sensitivity optical absorption magnetometers to measure minute fluctuations in the intensity of the earth's magnetic field has greatly expanded the ability of geophysical prospectors to locate and identify subterranean deposits of oil and precious metals. Furthermore, the precision of magnetic field detection by optical absorption magnetometers is so exact that such magnetometers permit airborne exploration of uncharted terrain, thereby greatly increasing both the speed of geophysical exploration and the ability of prospectors to reach remote and inaccessible terrain for geophysical examination.

The optical absorption magnetometer used in the system of this invention can be any one of the family of optically pumped magnetometers, e.g. the alkali-vapor rubidium and cesium instruments, or, preferably, the metastable helium magnetometer. The operation of such magnetometers is dependent upon the quantized nature of the absorption and radiation of energy of the atom. The planetary electrons of any atom can exist only in certain specific energy levels. In their lowest or ground state the electrons are stable. However, the electrons can be excited to certain specific and higher energy states by supplying the exact quantity of energy equal to the difference between the higher and the original state. The electrons can exist at the higher state for a time which is determined by statistical considerations. As an excited electron returns to a permissible lower state, the atom radiates an amount of electromagnetic energy equal to the energy difference involved in the transfer. It is significant that the frequency of this radiation is directly proportional to the energy difference.

For purposes of explanations, this invention will be described hereinbelow with reference to the helium metastable magnetometer, although it is not so limited but can be used generally with optical absorption magnetometers. Helium is of particular interest in magnetometry because it has atomic excitation states in which the energy differences are particularly suitable for measurement with the aid of recently developed optical pumping methods. In a helium metastable magnetometer the energy necessary to cause the atom to rise from the ground state $E_o$ to the highest energized state $E_1$ is $$E_1 - E_o = h\nu$$

where $h$ is Planck's constant and $\nu$ is the frequency of an activating or energizing light added to the system. This corresponds to the 1.08 micron (10,800 Angstrom) line of helium. In falling from the excited state $E_1$ to the metastable state $E_{om}$, the atom is "depumped" and radiates a quantity of light equivalent to $E_1 - E_{om}$. This light which represents one of the Zeeman lines of helium is radiated and lost to the system. Insofar as magnetometry is concerned, it is the remaining energy representing the energy retained in the metastable state $E_{om}$ as compared to the ground state $E_o$ that is significant. It is this energy which corresponds to the difference between two Zeeman states of helium and is directly proportional to the magnetic field strength. It is only necessary to measure this energy to evaluate the magnetic field.

A helium metastable magnetometer logically divides into several separate units: a helium absorption cell, a light source for excitation, a depumping control oscillator, a light detector, and a signal amplifier. The helium absorption cell is the basic element of the magnetometer and contains pure helium gas under reduced pressure. In operation, the light source provides light emitted at the excitation frequency of helium in the absorption cell. The depumping oscillator controls the release of helium atoms from the metastable to the ground state. The frequency of this oscillator when adjusted to obtain a maximum depumping signal is a measure of the resonance frequency of the metastable state and hence of the average strength of the magnetic field. It should be noted that the frequency of the resonance radiation of the metastable state of helium is not measured directly but indirectly by observing the effectiveness of the depumping oscillator in producing stimulated radiation in that state. The effectiveness is measured by the increase in absorption in the absorption cell of light from the light source after release from the metastable state takes place. The detection of depumping and thus the precise adjustment of the depumping oscillator frequency is accomplished by the light detector. Each controlled depumping operation is associated with the release of a large quantity of helium atoms from the stored or optically pumped metastable state to the stable state. At each depumping operation the number of atoms in the stable state and hence available for absorption of light at the excitation frequency from the exciter beam abruptly increases. The depumping is, therefore, associated with a decrease in intensity of the beam from the light source for excitation leaving the absorption cell and picked up by the detector. Lead sulfide or silicon cells are suitable for use as the detector. The small electrical signals developed in the detector by changes in the exciter beam intensity are then amplified to a useful level and applied to the control circuits including the signal amplifier.

In order to measure the depumping frequency, the frequency of the oscillator is caused to seek the frequency at which maximum depumping occurs and actually to sweep back and forth across a median frequency as it hunts the frequency of maximum depumping. According to present practice, the sweep signal is started at any point in time and the depumping frequency measured over a given period of time which does not necessarily include an integral number of sweep cycles. In such a system, errors are developed which can be eliminated by using a synchronized frequency measuring system as shown in Applicant's U.S. Pat. No. 3,467,856. This system provides a method of measuring the center of frequency of an FM signal so that a precise integral number of sweeps is included within the measuring interval. This is accomplished by synchronizing the sweep generator with the time base generator dividing chain and is applicable to any frequency measuring system which uses fixed measuring gates.

Frequency measuring systems, however, have the disadvantage that frequency counters are limited in accuracy to ± one cycle. Thus, for a one second measuring gate the resolution is no better than one hertz. Assuming that the signal being measured is 1.500 M Hz, then the possible error associated with the measurement would be ± 0.67 in $10^6$ parts.

A preferred method would be to use a period measuring system, i.e. measure the time interval for some fixed number of cycles to occur and then take the reciprocal to get frequency. If a one second measurement is used and a meter with a 100 M Hz time base, this technique would allow a resolution of 50–100 times that obtainable with cycle counting in the 1–2 M Hz range where the helium magnetometer normally operates.

A time accuracy of ± 0.01 microsecond is theoretically possible resulting in a frequency measuring accuracy of ± 1 in $10^8$ parts.

Unfortunately, this mode of operation, while giving improved resolution for fixed frequency measurement, introduces a large error when applied to a frequency modulated signal. This is caused by the fact that the measuring interval varies as the frequency varies and, therefore, includes a non-integral number of sweep periods. This error is not constant but is maximum when an odd number of sweep half-cycles is enclosed in the measuring interval, zero when an even number occurs, and varies within this range for in between cases.

SUMMARY OF THE INVENTION

Applicant has solved the aforementioned problem by having a period measuring system wherein the sweep frequency is dependent upon and is a sub-multiple of the depumping frequency. Instead of using a constant sweep frequency as done in the prior art, the present invention includes means for varying the sweep frequency in accordance with the magnetic field being measured so that the measuring period will always contain an integral number of sweep cycles. A system to accomplish this would include a frequency divider connected to the output of the depumping oscillator with feedback in turn to the oscillator. The output of the frequency divider is also fed to a phase detector which develops an error signal for controlling the frequency of the oscillator. Period measuring means is connected to a second frequency divider in series or parallel to the first divider and determines the time required to count a predetermined number of sweep cycles.

DETAILED DESCRIPTION OF THE INVENTION

Figure 1:
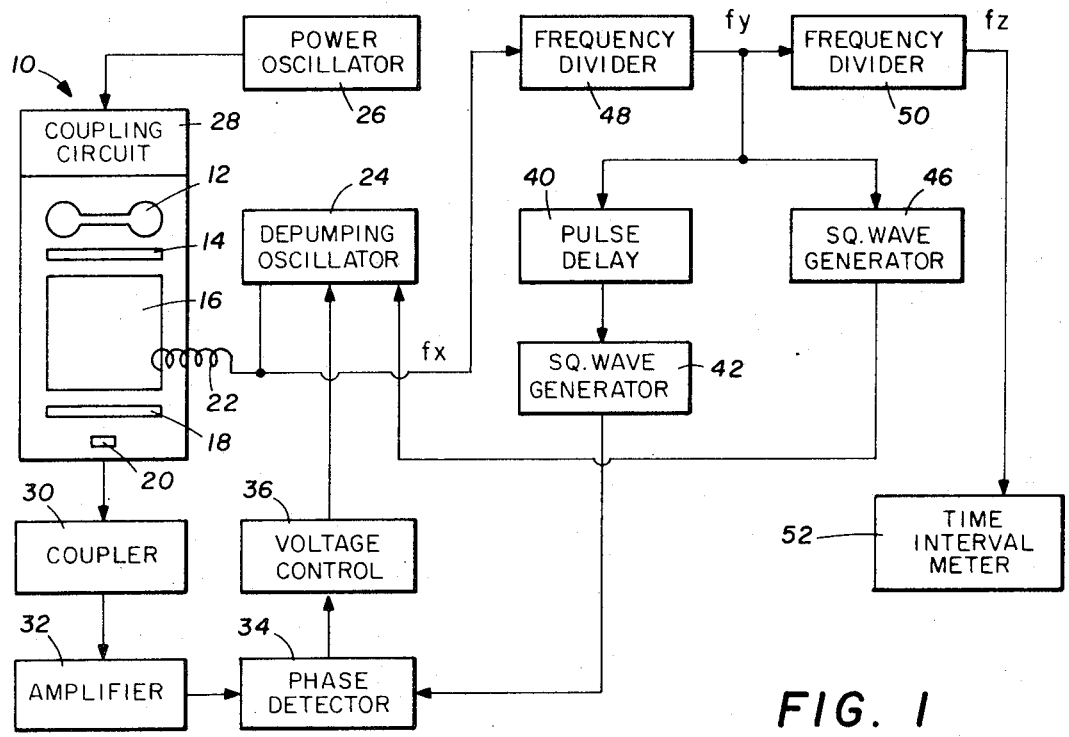
FIG. 1 is a schematic representation of a magnetometer system in accordance with Applicant's invention.

Referring now to FIG. 1, helium magnetometer unit 10 generally includes helium exciter lamp 12, circular polarizing lens 14, and absorption cell 16, filter 18, and detector 20. In operation, briefly, exciter lamp 12 emits light at the excitation frequency of helium which is contained in absorption cell 16 and directs this light through cell 16 toward detector 20. Simultaneously, helium atoms in cell 16 are released from the metastable to the ground state, i.e. depumped, by a signal supplied through a depumping coil 22 from an oscillator 24, both described below. The frequency of this signal when adjusted to obtain maximum depumping is a measure of the resonance frequency of the metastable state and hence of the average strength of the magnetic field in which the cell 16 is arranged. Each controlled depumping operation is associated with the release of a large quantity of helium atoms from the metastable to the ground state so that at each depumping operation the number of atoms in the stable state and hence available for absorption of light from lamp 12 abruptly increases. The depumping is, therefore, associated with a decrease in the intensity of the light beam reaching detector 20. Detector 20 produces an electrical signal corresponding to the light intensity which is then used to control the depumping frequency to obtain maximum depumping so that the frequency is a measure of the earth's magnetic field as described below.

The absorption cell 16 comprises a closed cylindrical vessel containing spectroscopically pure helium gas at a pressure, e.g. 1 to 100 mm. of mercury, such that the metastable helium atoms produced in the discharge have sufficient lifetime to permit an alignment. The helium in the cell is excited to produce atoms in the metastable state by, for example, an electric discharge, produced in the vessel by electrodes (not shown) fitted at each end of the vessel. The electrical discharge strength should be sufficient to maintain a density of metastable atoms in a range of about $10^9$/cubic centimeter to $10^{11}$/cubic centimeter. The cylindrical vessel is fabricated from a material such as glass which is transparent to the helium resonance radiation. If desired, the vessel may be constructed of an opaque material and provided with windows transparent to the resonance radiation. The absorption cell may be of any arbitrary shape; however, the preferred shape is that of the cylinder as shown.

The method of exciting the helium in the absorption cell can, as mentioned, be by means of a direct electric current; however, other means such as a high frequency electric field can be used. If a high frequency field is used, the electrodes referred to above are unnecessary. Another method suitable for producing metastable helium atoms in the absorption cell is through the use of a quantity of natural or artificial radioactive material placed inside or adjacent to the vessel. Additionally, X-rays generated without or within the vessel can be utilized for the production of metastable helium atoms.

The helium excitation lamp 12 is essentially a discharge tube similar in operation to the aforementioned discharge tube, i.e. absorption cell 16. It comprises a closed vessel, e.g. cylindrical, dumbbell shaped, etc., which is filled with helium gas and is excited by means of electrodes (not shown) provided at either end of the vessel, e.g. in the form of electrically conductive coatings on the glass vessel. The lamp 12 is electrically driven by exciter lamp power oscillator 26 through lamp coupling circuit 28. Since excitation lamp 12 is used to radiate resonance radiation, it is desired to excite the helium in lamp 12 much more strongly than in absorption cell 16. In operation, helium excitation lamp 12 is energized from power oscillator 26 to radiate unpolarized resonance radiation along a path through absorption cell 16 which radiation is polarized by means of circular polarizing filter 14.

Detector 20 which monitors the helium resonance radiation transmitted through the absorption cell 16 can be of any several such devices sensitive to helium resonance radiation, i.e. the 1.08 micron line of helium. Suitable devices are lead sulfide or silicon detectors. Phototubes can also be used. Detector 20 is arranged to receive the helium resonance radiation transmitted through the absorption cell 16. Optical filter 18 which is designed to pass only 1.08 micron light is optional.

The electrical signal output of the detector 20 is related to the frequency of depumping oscillator 24. It is minimum when the depumping oscillator is set to the precise frequency corresponding to the magnetic field present in the absorption cell 16. The detector coupler 30 passes the signal to a signal amplifier 32 where it is filtered to pass only the proper frequency components. The amplified signal is then passed to phase controlled rectifier or phase detector 34 which develops an error signal used to control the frequency of the depumping oscillator 24 as described below. Phase detector 34 is keyed by a phase reference voltage from frequency divider 48 in the manner described below.

Referring now to depumping oscillator 24, a depumping signal is applied to cell 16 through depumping coil 22. The depumping frequency applied to the absorption cell through coil 22 controls release of the helium atoms from the metastable state to the ground state. This frequency, when adjusted to obtain maximum light absorption in absorption cell 16, is a measure of the resonance frequency of the metastable state as discussed above and hence of the average strength of the magnetic field being measured. In order to move the depumping oscillator frequency to obtain maximum depumping, the frequency of oscillator 24 is adjusted by a signal from phase detector 34 which, as mentioned above, develops an error signal used to control this oscillator and keep it at the frequency of maximum depumping.

The error signal from phase detector 34 is first passed through manually controlled voltage device 36 in the servo feedback loop which sets the general range of operation. During start-up of the magnetometer 10, a manually adjustable voltage signal is first applied to oscillator 24 with the servo loop opened while observing the output of phase detector 34. A point is found in this observation where phase detector 34 output goes from zero to a positive maximum, and then through zero to a negative maximum and back to zero. The point where polarity reverses is that position at which the proper depumping frequency is being used and at this point the servo loop in device 36 is closed to automatically control the frequency of oscillator 24. Since the construction of such devices is well known, further description is unnecessary.

The output signal from phase detector 34 is a direct current signal and slowly controls oscillator 24 to adjust the frequency of the oscillator output signal and seek out the proper depumping frequency by continually changing the frequency to obtain maximum depumping of the helium atoms in absorption cell 16 as measured by detector 20.

A second input signal for oscillator 24 is required in order to sense the proper depumping frequency, i.e. the frequency of the output signal of oscillator 24 which is a measure of the strength of the magnetic field. This second input signal for depumping oscillator 24 rapidly sweeps the frequency back and forth across the median frequency determined by the output signal of phase detector 34. The sweep signal can be provided from an external source and can be of any desired shape, e.g. triangular wave, sine wave, square wave, etc. It is only necessary to move the depumping oscillator frequency both above and below the proper frequency corresponding to the ambient magnetic field in order to sense the point of maximum light absorption in the absorption cell 16 as evidenced by average output from phase detector 34. If zero output is not obtained, the error voltage developed will be applied to depumping oscillator 24, causing it to shift frequency until zero voltage is obtained. It is obvious that the frequency of depumping oscillator 24 is not constant. Its frequency varies slowly, under control of its servo feedback, in response to magnetic field changes and superimposed on this variation is a small rapid frequency variation due to the application of the sweep signal.

The output signal from oscillator 24, $f_x$, is applied to frequency divider 48 which produces an output signal, $f_y$, suitable to sweep oscillator 24. $f_y$ must be a lower frequency than $f_x$ and generally is on the order of 100–1,000 hertz for helium magnetometers. $f_y$ is applied to square wave generators 46 and 42 which sweep oscillator 24 and phase detector 34, respectively. (If desired, one square wave generator can be used with dual outputs going to 24 and 34.) The output voltage from square wave generator 42 keys phase detector 34 to pass only those signals which are in phase with the applied voltage. Therefore, phase detector 34 acts as a signal filtering means in addition to developing the error signal discussed above. The output from square wave generator 46 controls the sweeping frequency applied to depumping oscillator 24.

Included in the circuit of square wave generator 42 is a pulse delay device 40 to provide system phase adjustment. The delay device 40 is set so that the input to phase detector 34 occurs in phase with the signal from amplifier 32. (The delay could also have been in the input to generator 46 since the system is periodic.)

In addition to going to square wave generators 42 and 46, $f_y$ passes to a second frequency divider 50 which generates output signal $f_z$. Frequency divider 50 is chosen to reduce the input frequency $f_y$ to the desired value for periodic measurements. If desired, dividers 48 and 50 could have been wired in parallel rather than in series. The output from divider 50, $f_z$, passes to time interval meter 52 which measures the time required for one cycle to occur. The inverse of the measurement made by meter 52 gives depumping frequency after multiplying by factors to correct for dividers 48 and 50.

The sweep variation of oscillator 24 is present only to sense that the output frequency, $f_x$, is correct for the ambient magnetic field. Nevertheless, the frequency variations due to the sweep can cause an error in frequency determination and, in turn, in magnetic field measurement. Prior art systems in general use a sweep signal that has a constant frequency which is not related in any way to the frequency being measured and this causes significant error when an attempt is made to achieve greater than 1 Hz resolution through use of period measurement.

Figure 3:
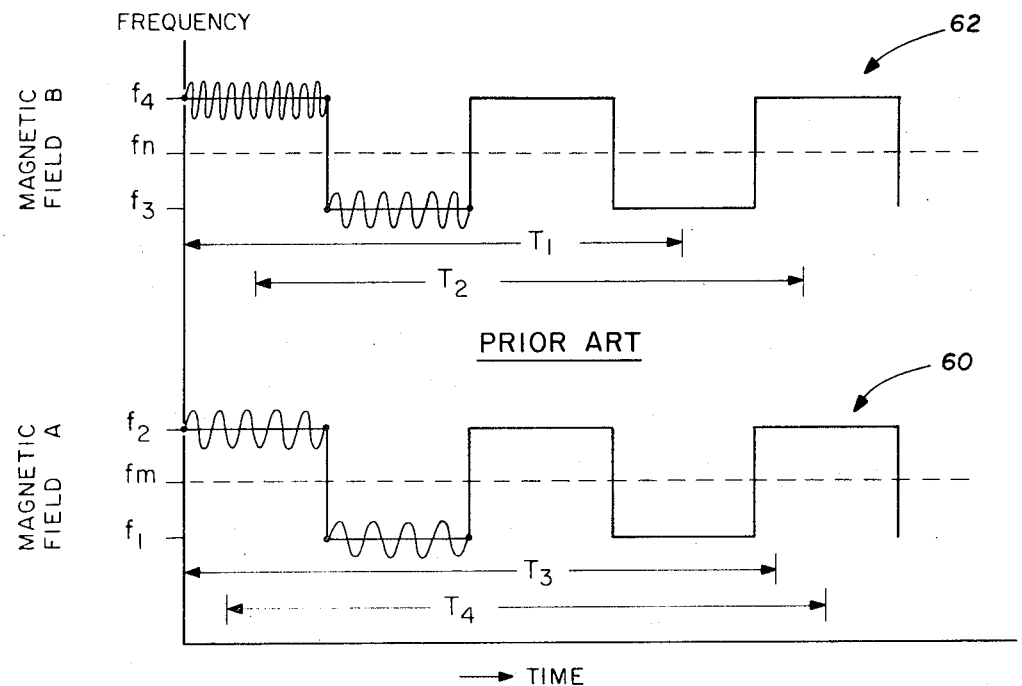
FIG. 3 is a wave diagram showing frequency modulation according to the prior art.

This may be seen in reference to FIG. 3 where 60 is a frequency sweep in magnetic field A and 62 is a frequency sweep in magnetic field B. Frequencies $f_1$ and $f_2$ represent the upper and lower limits of frequency which the depumping oscillator reaches as a result of sweep 60 and $f_3$ and $f_4$ are the frequency limits as a result of sweep 62. $f_n$ is the average frequency of $f_3$ and $f_4$ (field B) and $f_m$ is the average frequency of $f_1$ and $f_2$ (field A). If one attempts to determine $f_n$ and $f_m$ by measurement of period and reciprocation to obtain frequency, an error is introduced. For example, assume that $T_1$ represents the time interval required for some number of cycles, such as 1,500,000, to occur. A different time $T_2$ will be obtained if the measuring interval happens to contain a larger or smaller proportion of $f_4$ than $f_3$. Conversely, a larger proportion of $f_3$ than $f_4$ will result in a longer time for 1,500,000 cycles to occur. A lower magnetic field will result in lower frequencies $f_2$ and $f_1$ and correspondingly longer and different time $T_3$ and $T_4$. Reciprocation of time intervals $T_1$, $T_2$, $T_3$, and $T_4$ will result in frequencies which are not true averages of $f_4$ and $f_3$ or $f_1$ and $f_2$. The values obtained will be dependent upon the particular point in the sweep cycles where the measurements start and stop which is uncontrolled. Because of this uncertainty, the measured values of $f_m$ and $f_n$ may be substantially in error. Moreover, this error cannot be corrected by calibration since it is variant from field to field.

Figure 4:
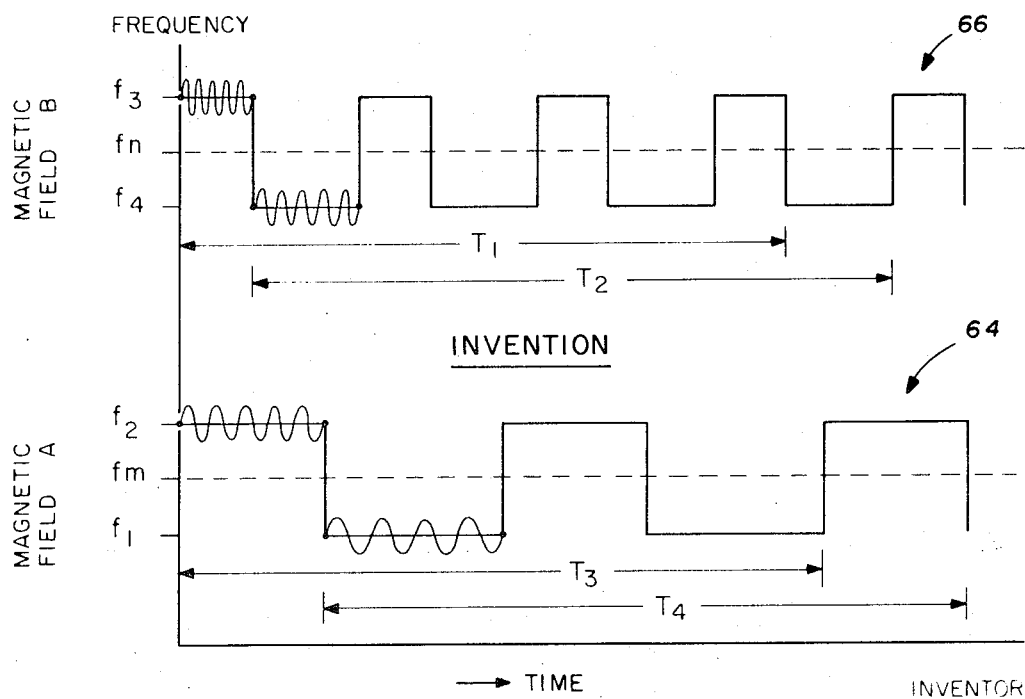
FIG. 4 is a wave diagram showing frequency modulation according to the invention.

What Applicant has done according to the present invention is to vary the sweep frequency so that it is always a sub-multiple of the depumping frequency. This synchronizes the measuring intervals with the FM sweep so that integral number of sweep cycles are always measured. This is best seen in FIG. 4 where 64 and 66 are frequency sweeps in magnetic fields A and B and $f_1$, $f_2$, $f_3$, $f_4$, $f_m$, and $f_n$ have the same meanings as discussed in conjunction with FIG. 3. It will be seen that frequencies $f_1$ and $f_2$ both include an integral number of cycles (e.g. 5) for each sweep cycle. This was done by varying the period of sweep 64 so that it is longer at lower frequencies and shorter at higher frequencies. Similarly with respect to sweep 66, each sweep cycle includes an integral number of cycles of $f_3$ and $f_4$, respectively. Comparing sweeps 64 and 66, it is evident that each sweep is made to vary according to the upper and lower frequencies and that the period and balance of the sweep will change from field to field. (Referring again to FIG. 3, the frequency sweep was always the same irrespective of the field.) Also, it will be seen that in FIG. 4 $T_1$ and $T_2$ are equal and that $T_3$ and $T_4$ are equal. This means that $f_n$ and $f_m$ will be true averages and that the same measurements will be obtained time after time.

Figure 2:
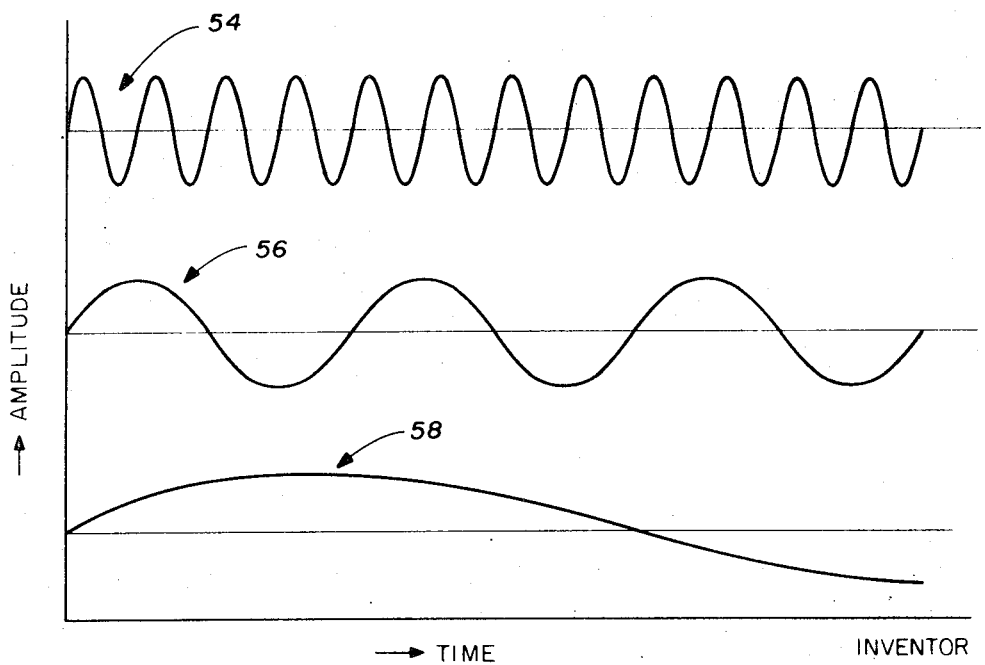
FIG. 2 shows wave diagrams used in explaining operations in FIG. 1.

The desired synchronization was achieved by frequency modulating oscillator 24 at an exact sub-multiple of its output signal, $f_x$, using frequency divider 48. Referring to FIG. 2, assume that wave 54 represents $f_x$; wave 56, $f_y$; and wave 58, $f_z$. It will be seen that $f_y$ is a sub-multiple of $f_x$ and that $f_z$ is a sub-multiple of $f_y$. The essence of the invention is that oscillator 24 is frequency modulated at a sub-multiple of its output frequency. (Phase detector 34 will, of course, also be controlled by the same sub-multiple of $f_x$ as oscillator 24.) Divider 50 reduces $f_y$ to $f_z$ as a matter of convenience so that the period of $f_z$ will be the time interval measured by meter 52.

The first divider 48 can divide the depumping frequency down to 100 Hz to 1 K Hz. Thus, in the 1.5 M Hz frequency range which is typical for magnetic fields encountered in the central U.S.A., a division of 1,500X would be appropriate for obtaining $f_y$. If divider 50 gives a division of 1,000X, the resulting period of $f_z$ will be about one second. The 1000 X and 1500 X dividers may be assembled from integrated circuit logic by procedures well known in the art. For example, Texas Instruments integrated circuits SN 74121, SN 7490, and SN 7490 may be connected in series to give a 1000 X divided signal and TI circuits SN 7490, SN 7490, and SN 7493 connected to give a 1500 X divider; the time interval meter may be a Hewlett Packard counter such as Model No. 5264A.

What is claimed is:

1. In a device for measuring the strength of a magnetic field comprising a contained body of optically excitable atoms which are acted upon by said magnetic field when in the presence thereof; a source of resonance radiation impingeable upon and interacting with said body for producing alignment of said atoms contained therein; depumping means to create and direct into said body a radio frequency magnetic field of such frequency as to diminish the alignment of atoms contained in said body including a variable frequency control oscillator; electrical means to measure the changes in the amount of resonance radiation absorbed by said atoms including a radiation detector and a frequency sweep means; and means responsive to the output of said radiation detector for adjusting the frequency of said variable oscillator, the improvement wherein said electrical means includes means for making the sweep frequency a sub-multiple of the depumping frequency comprising frequency dividing means having as an input the output of said variable oscillator, means for sweeping the frequency of said variable oscillator with the output from said frequency dividing means, and period measuring means to determine the time required to count predetermined number of sweep cycles.

2. The improvement of claim 1 wherein a phase detector is connected between said radiation detector and said depumping means which is keyed to the output signal from said frequency dividing means.

3. The improvement of claim 1 wherein a second frequency dividing means is connected between the output of said frequency dividing means and said period measuring means.

4. The improvement of claim 1 wherein said optically excited atoms are helium.

* * * * *